United States Patent
Chou et al.

(10) Patent No.: US 7,116,560 B2
(45) Date of Patent: Oct. 3, 2006

(54) PULSATING CURRENT INVERTER CONTROL CIRCUIT

(75) Inventors: Chin-Wen Chou, Hsin-Tien (TW); Ying-Nan Cheng, Hsin-Tien (TW); Chin-Biau Chung, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 34 days.

(21) Appl. No.: 10/995,259

(22) Filed: Nov. 24, 2004

(65) Prior Publication Data

US 2006/0109699 A1 May 25, 2006

(51) Int. Cl.
*H02M 3/335* (2006.01)
*H02M 1/12* (2006.01)

(52) U.S. Cl. ............................. 363/16; 363/34; 363/41

(58) Field of Classification Search .................. 363/16, 363/20, 34, 73, 97, 40, 41; 315/276, 279, 315/282, 287
See application file for complete search history.

(56) References Cited

U.S. PATENT DOCUMENTS

| | | | | | |
|---|---|---|---|---|---|
| 5,459,651 | A | * | 10/1995 | Maehara | 363/34 |
| 6,396,717 | B1 | * | 5/2002 | Yasumura | 363/97 |
| 6,452,816 | B1 | * | 9/2002 | Kuranuki et al. | 363/97 |

* cited by examiner

*Primary Examiner*—Jessica Han
(74) *Attorney, Agent, or Firm*—Birch, Stewart, Kolasch & Birch, LLP

(57) ABSTRACT

A pulsating current inverter control circuit aims to convert AC power provided by an external electric source to a pulsating current through a rectification unit. The inverter has a control unit which outputs an operation frequency to an actuation unit to divide the pulsating current to a plurality of electric pulse waves to drive a transformer to perform voltage transformation and drive a load. The invention further includes an inspection unit which has a preset reference electricity value to compare with the pulsating current and output an activation signal and a deactivation signal to activate or deactivate the actuation unit so that the transformer stops performing voltage transformation while the actuation unit is deactivated. Thus the transformer can output power to drive the load as desired.

3 Claims, 3 Drawing Sheets

PULSATING CURRENT INVERTER CONTROL CIRCUIT

FIELD OF THE INVENTION

The present invention relates to a pulsating current inverter control circuit and particularly to a control circuit for converting AC to a pulsating current which is applied to an inverter to be transformed to drive a load.

BACKGROUND OF THE INVENTION

The inverter is widely used today, especially in the newly developed electronic and technological products. For instance a liquid crystal display (LCD) panel or LCD TV mostly has an inverter to transform external AC to a high voltage electricity to actuate and ignite a cold cathode lamp. The conventional inverter transforms AC through a rectification unit to a pulsating current, then adjust to a low voltage DC through a filter capacitor or a power factor regulator. The lower voltage DC is fed into a transformer to boost voltage. As the voltage boosting effect of the transformer is determined by input electricity, the output power of the conventional inverter is limited. Moreover, the conventional circuit design is complicated and costly, and the size cannot be shrunk as desired. All this hinders the design and development of the modern electronic products that have to conform to the trend of slim and light.

Therefore the inverter that directly uses pulsating current has been developed. This type of inverter eliminates the DC conversion circuit, and directly feeds the pulsating current into a transformer. It can save fabrication cost and reduce the size and make design simpler. Moreover, the transformer does not have to function under strict DC of a uniform voltage, service life is longer. However, the pulsating current exists in a minimum voltage-maximum voltage-minimum voltage fashion. When the transformer operates in the minimum voltage range, the output power is lower and cannot drive the cold cathode lamp. This results in loss of output power and decrease of total efficiency.

SUMMARY OF THE INVENTION

Therefore the primary object of the invention is to solve the aforesaid disadvantages. The present invention provides an inverter that can output a desired effective power to drive a load. During the ineffective power output condition, the transformer stops operation to maintain the designed life span. According to the invention, an external electric power source provides AC to a rectification unit that is converted to a pulsating current. Then a control unit of the inverter outputs an operation frequency to an actuation unit to divide the pulsating current to a plurality of electric pulse waves to drive a transformer to perform transformation and drive a load. The invention further provides an inspection unit which has a preset reference electricity value to compare with the pulsating current to output an activation signal or a deactivation signal to activate or deactivate operation of the actuation unit so that the transformer stops performing transformation when the actuation unit is in the deactivated condition. Therefore the transformer can output power to drive the load as desired.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
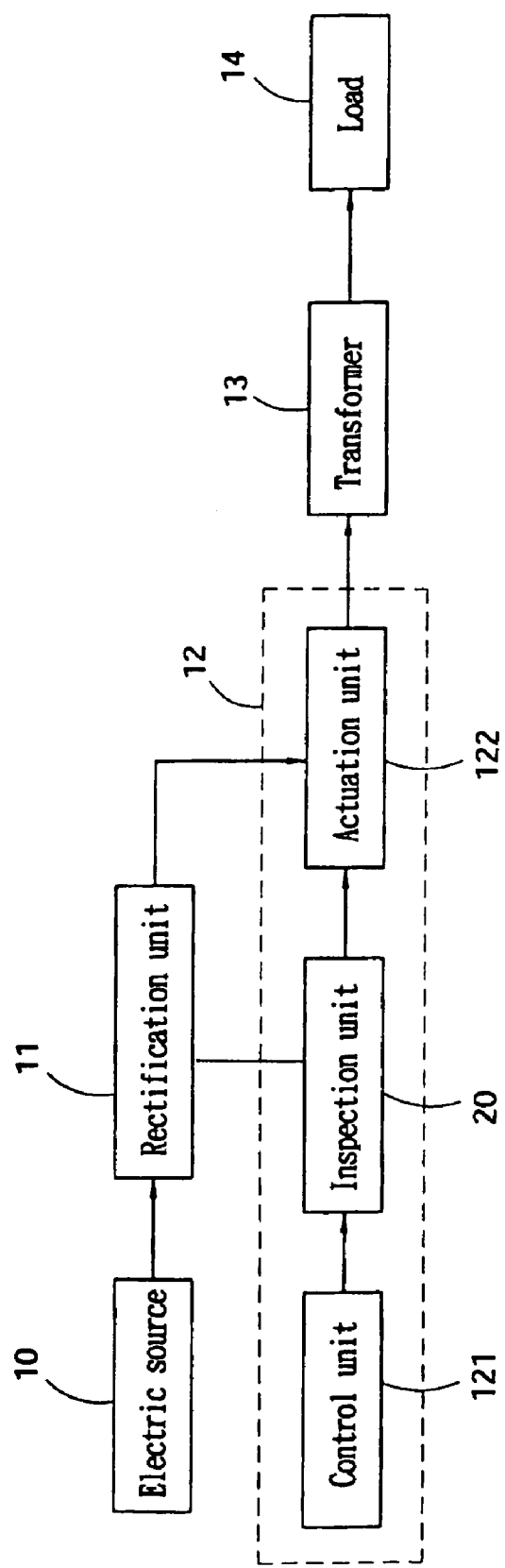
FIG. 1 is a schematic block diagram of the inverter circuit of the present invention.

Please referring to FIG. 1, the present invention provides a pulsating current inverter control circuit. The pulsating current inverter aims to transform AC provided by an external electric source 10 through a rectification unit 11 to a pulsating current 30. The inverter of the invention receives the pulsating current 30 and transforms the voltage to drive a load 14. The inverter mainly includes an actuation circuit 12 which has a control unit 121 to output an operation frequency. The control unit 121 is a pulse width modulator (PWM). The control unit 121 is connected to an actuation unit 122 which is a power transistor (MOS). The actuation unit 122 is driven by the operation frequency to divide the pulsating current 30 to a plurality of electric pulse waves 50. The invention further has an inspection unit 20 to control activation and deactivation of the actuation unit 122. The inspection unit 20 contains a preset reference electricity value 40, and takes samples of comparison electricity from the pulsating current 30 to perform logic judgement comparison, and based on the comparison result to output an activation signal or a deactivation signal to activate or deactivate the operation of the actuation unit 122. When the actuation unit 122 is activated, the electric pulse waves 50 enter a transformer 13 to be transformed to drive the load 14. The transformer 13 may be a winding transformer or a piezoelectric transformer.

Figure 2:
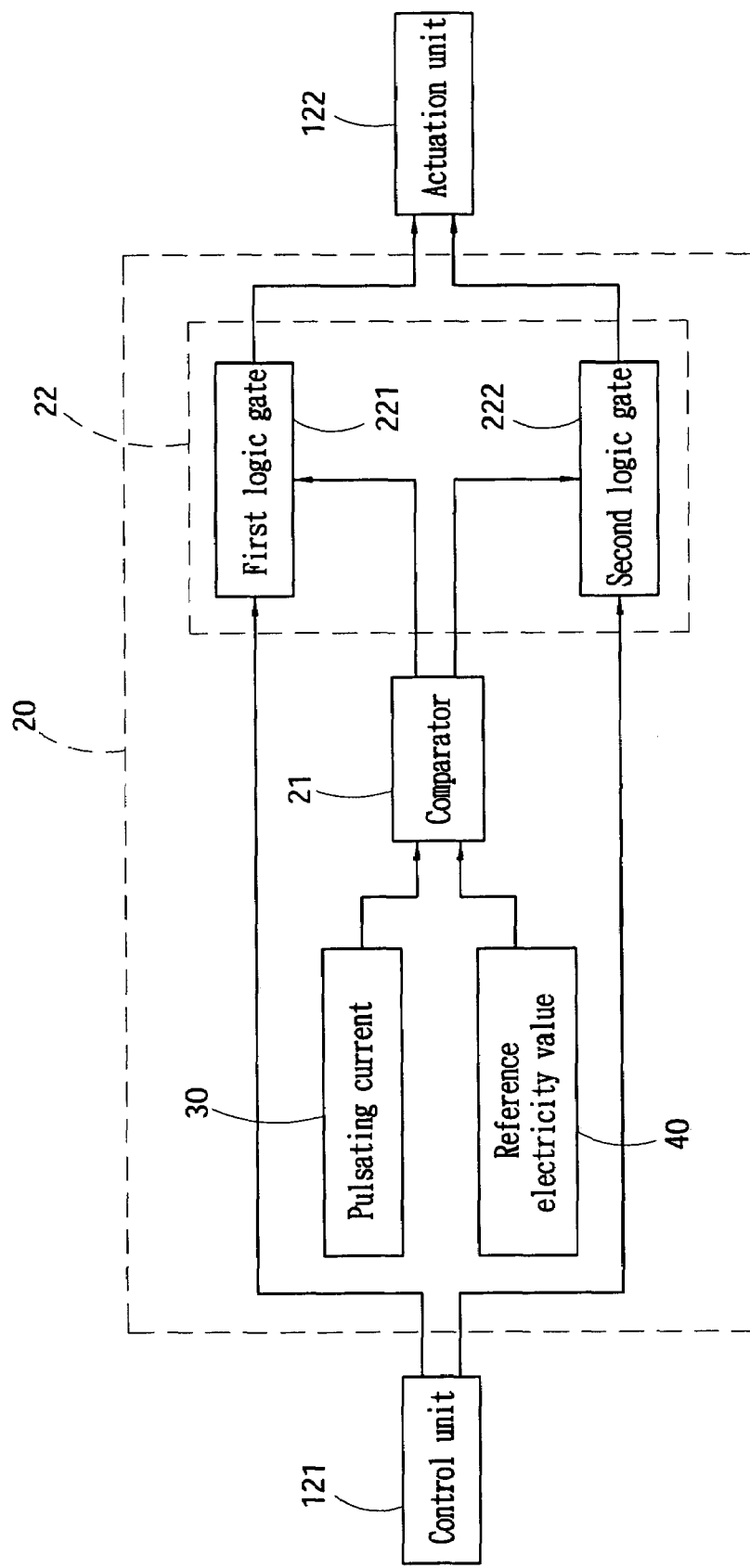
FIG. 2 is a schematic block diagram of an embodiment of the actuation circuit of the present invention.
Figure 3:
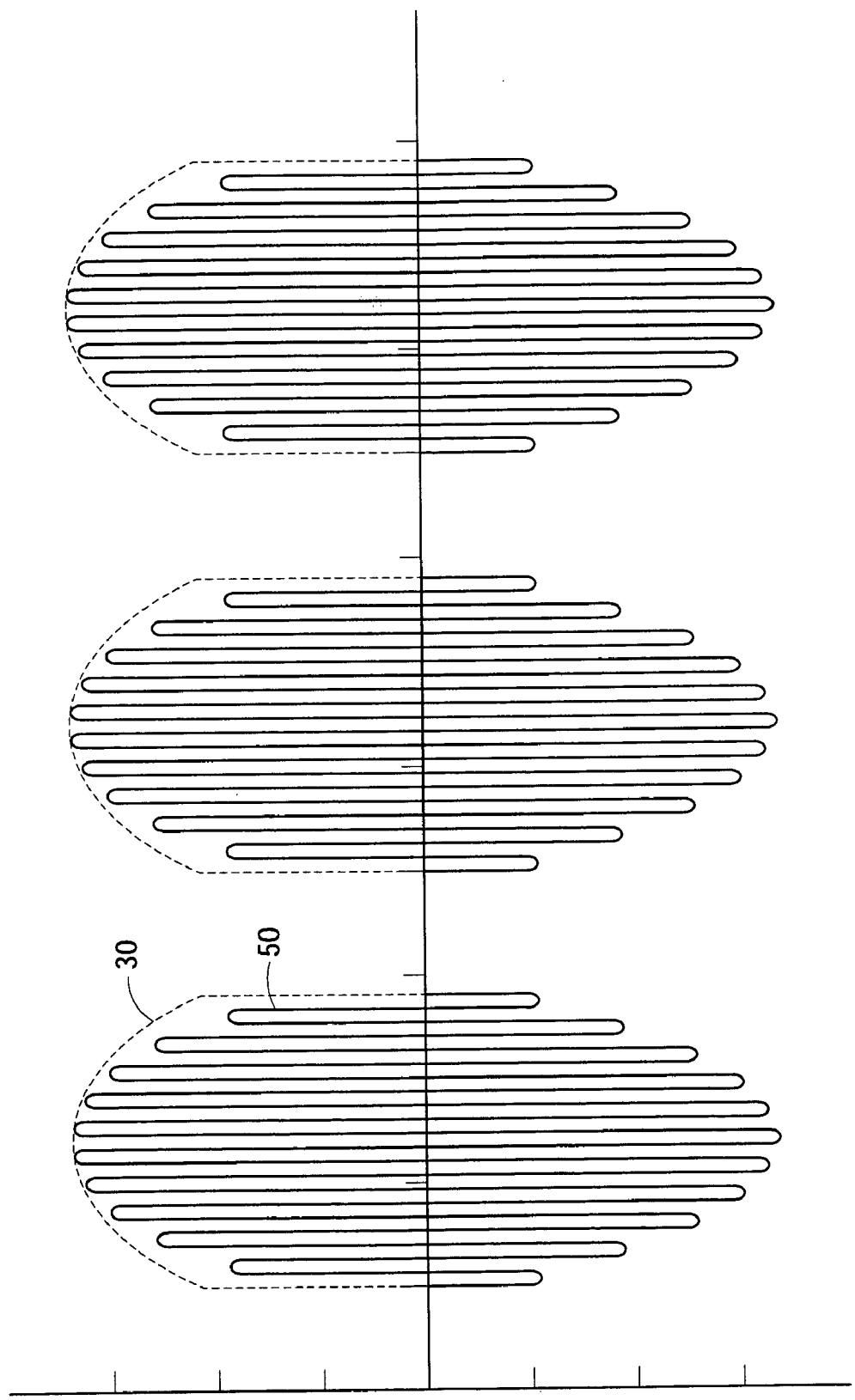
FIG. 3 is a schematic view of the operation wave forms of the present invention.

Refer to FIG. 2 for an embodiment of the actuation circuit 12 of the invention. The inspection unit 20 may be designed in various fashions. In this embodiment, the inspection unit 20 includes a comparator 21 to compare the reference electricity value 40 with the pulsating current 30 and output the activation and deactivation signals, and a switching device 22 connecting to the logic comparator 21 to receive the activation and deactivation signals to activate or deactivate the actuation unit 122. The switching device 22 includes a first logic gate 221 to control the positive signal of the actuation unit 122 and a second logic gate 222 to control the inverted signal of the actuation unit 122. The actuation unit 122 may be a P,N type or a N,N type power transistor. When the pulsating current 30 is input to the actuation unit 122, the comparator 21 compares the preset reference electricity value 40 with the pulsating current 30. As the preset reference electricity value 40 is determined by the actual power output by the transformer 13 after having received the electric pulse waves 50 and performed transformation that can drive the load 14, if the sampling voltage of the pulsating current 30 is lower than the reference electricity value 40, the comparator 21 will output the deactivation signal to the first logic gate 221 and the second logic gate 222. The first logic gate 221 and the second logic gate 222 deactivate respectively the positive signal and the inverted signal of the actuation unit 122 so that the actuation unit 122 stops transforming the pulsating current 30 to the electric pulse waves 50. And the transformer 13 also stops ineffective power output to the load 14. On the contrary, if the sampling voltage of the pulsating current 30 is higher than the reference electricity value 40, the actuation unit 122 operates to transform the pulsating current 30 to the electric pulse waves 50, and the transformer 13 receives the electric pulse waves 50 and outputs an effective power to drive the load 14. The operation waveform is shown in FIG. 3.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A pulsating current inverter control circuit for receiving AC provided by an external electric source and converting to a pulsating current through a rectification unit having an inverter to receive and transform the pulsating current to drive a load, the inverter comprising:

an actuation circuit including a control unit to output an operation frequency, an actuation unit driven by the operation frequency to divide the pulsating current to a plurality of electric pulse waves and an inspection unit having a preset reference electricity value to compare with the pulsating current to output an activation signal and a deactivation signal to activate or deactivate the actuation unit; and a transformer for receiving the electric pulse waves and transforming voltage to drive the load.

2. The pulsating current inverter control circuit of claim 1, wherein the inspection unit includes a comparator to compare the reference electricity value with the pulsating current and output the activation signal and the deactivation signal, and a switching device connecting to the comparator to receive the activation signal and the deactivation signal to activate or deactivate the actuation unit.

3. The pulsating current inverter control circuit of claim 2, wherein the switching device includes a first logic gate to control positive signals of the actuation unit and a second logic gate to control inverted signals of the actuation unit.

* * * * *